(12) United States Patent
Usoro

(10) Patent No.: US 7,506,711 B2
(45) Date of Patent: Mar. 24, 2009

(54) ACCESSORY DRIVE SYSTEM AND METHOD FOR A HYBRID VEHICLE WITH AN ELECTRIC VARIABLE TRANSMISSION

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 417 days.

(21) Appl. No.: 11/333,620

(22) Filed: Jan. 17, 2006

(65) Prior Publication Data

US 2007/0163818 A1     Jul. 19, 2007

(51) Int. Cl.
*B60K 6/24* (2007.10)
*B60K 6/48* (2007.10)
(52) U.S. Cl. ..................... 180/65.2; 903/948
(58) Field of Classification Search ........... 180/65.2, 180/65.3, 65.4; 903/948; 123/198 F
See application file for complete search history.

(56) References Cited

U.S. PATENT DOCUMENTS

| | | | | |
|---|---|---|---|---|
| 5,635,805 A | * | 6/1997 | Ibaraki et al. | 318/139 |
| 5,669,842 A | * | 9/1997 | Schmidt | 475/5 |
| 5,806,617 A | * | 9/1998 | Yamaguchi | 180/65.2 |
| 6,048,288 A | * | 4/2000 | Tsujii et al. | 477/5 |
| 6,053,266 A | * | 4/2000 | Greenhill et al. | 180/65.3 |
| 6,501,190 B1 | * | 12/2002 | Seguchi et al. | 290/46 |
| 6,889,125 B2 | * | 5/2005 | Nakao et al. | 701/22 |
| 7,024,858 B2 | * | 4/2006 | Gray Jr. | 60/709 |

\* cited by examiner

*Primary Examiner*—Frank B Vanaman

(57) ABSTRACT

An accessory drive system for a hybrid electric vehicle having an electric variable transmission. The apparatus includes an engine operatively connected to the electric variable transmission. The electric variable transmission includes a gear arrangement configured to selectively produce a plurality of speed ratios. The electric variable transmission also includes at least two motor/generators connected to the gear arrangement, and to a storage device. A drive pulley is connected to an output shaft of the engine. A plurality of driven pulleys are each connected to an accessory. A drive belt connectively couples the drive pulley and the plurality of driven pulleys. A controller is operatively connected to the engine and the motor/generators, and is configured to control the engine and the motor/generators to ensure the accessories are adequately powered.

9 Claims, 1 Drawing Sheet

ACCESSORY DRIVE SYSTEM AND METHOD FOR A HYBRID VEHICLE WITH AN ELECTRIC VARIABLE TRANSMISSION

TECHNICAL FIELD

The present invention is drawn to a system configured to drive one or more accessories on a hybrid electric vehicle having an electric variable transmission (EVT).

BACKGROUND OF THE INVENTION

The accessories in a conventional motor vehicle are powered by output from the engine. A hybrid electro-mechanical vehicle generally includes both an internal combustion engine and one or more electric motor/generators. Some of the accessories in a hybrid vehicle may require power while the engine is off and the vehicle is at a stand-still or being powered by the electric motor/generators. Traditionally, in order to power hybrid vehicle accessories when the engine is off, it was necessary to provide each such accessory with a separate electric motor.

The typical automotive accessory drive system consists of a drive pulley connected to an output shaft of the engine, typically the crankshaft. Wrapped around this pulley is a flexible drive belt, which in turn is wrapped around a plurality of driven pulleys. This flexible drive belt transmits drive forces between the drive pulley and the driven pulleys. The driven pulleys may be drivably attached to accessories known in the art such as a power steering pump, air conditioning compressor, alternator, and water pump.

An electrically variable transmission (EVT) utilizes one or more electric devices, such as motors/generators, and a differential gearing arrangement to provide a continuously variable ratio drive between input and output. An EVT is particularly useful in hybrid electric vehicle powertrains including an engine that is directly coupled to the transmission input and also including a storage device, such as a battery, used to supply power for propulsion and to recover energy from braking.

SUMMARY OF THE INVENTION

The apparatus and method of the present invention provide an accessory drive system for a hybrid electric vehicle having an electric variable transmission. The apparatus includes an engine operatively connected to an electric variable transmission. The electric variable transmission includes an arrangements of gears, at least two electric motor-generators, an energy storage device functionally connected to the motor-generators through a controller, optional selectively engagable torque transmitting devices, and is configured to selectively produce a wide range of speed ratios between the transmission input and output, as is well known in the art. The input shaft of the electric variable transmission is operatively connected with the engine crankshaft either directly or through a damper mechanism. The output shaft of the EVT is operatively connected with the final drive mechanism. A drive pulley is connected with the output shaft of the engine. A plurality of driven pulleys are respectively each connected to an accessory. A drive belt connectively couples the drive pulley and the plurality of driven pulleys, and is operable to transfer drive forces between the drive pulley and the plurality of driven pulleys. A controller is operatively connected to the engine and the motor/generators, and is configured to control the engine and the motor/generators to ensure the accessories are adequately powered. It is well known in the art that the two motor-generators of the EVT can be controlled to yield a continuously variable speed ratio between the EVT input and output. Therefore, it is possible to realize a desired input speed for any given practical output speed, including non-zero input speed for a zero output speed (vehicle stop).

The method of the present invention allows the accessories to be driven by power from the engine or the motor-generators of the EVT under all vehicle operating conditions without the need for individual accessory electric drive motors, as is often currently practiced, by requiring that the EVT be operated to maintain a minimum input (engine) speed even when fuel to the engine is shut off and/or the vehicle is stopped.

According to one aspect of the invention, the method includes establishing a predefined minimum engine speed at which all of the accessories remain fully operational.

According to another aspect of the invention, the EVT is controlled to ensure that the input speed (therefore the engine crankshaft speed and accessory drive pulley speed) is not operated below the predefined minimum engine speed when the vehicle is in operation, including when fuel is cut off to the engine to reduce fuel consumption.

According to yet another aspect of the invention, for engines equipped with flexible valve actuation, the method includes appropriately manipulating the intake and exhaust valves (for example, keeping both intake and exhaust valves closed) when fuel to the engine is shut off and the accessories are being driven by power from the motor-generators through the engine crankshaft, in order to reduce rotational resistance and pumping losses, and so improve the efficiency of the accessory drive system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
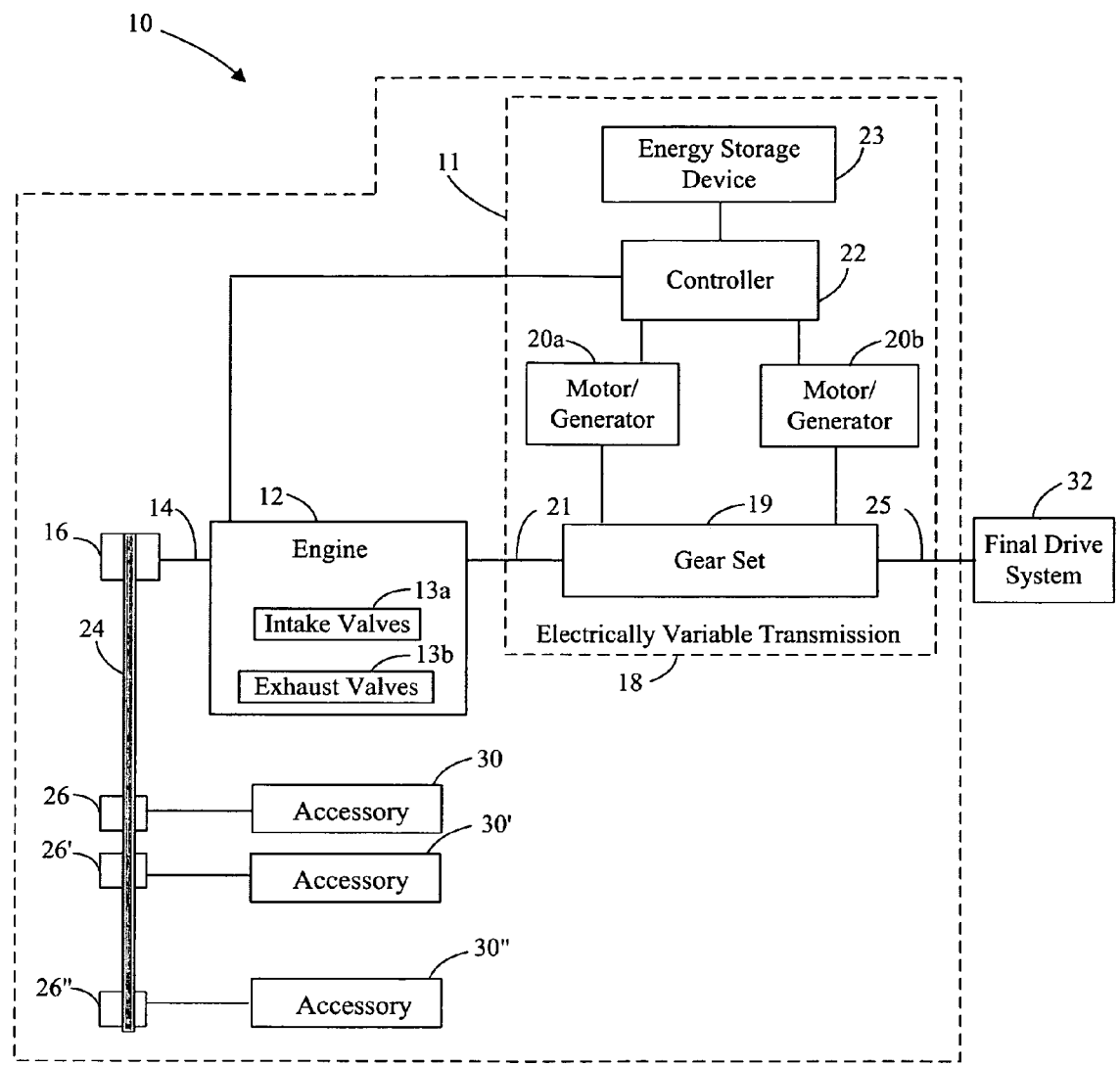
FIG. 1 is a schematic diagram of an accessory drive system for a hybrid electric vehicle having an electric variable transmission.

Referring to the drawings, wherein like reference numbers refer to like components, FIG. 1 shows a schematic representation of a hybrid electric vehicle 10 having an accessory drive system 11. The accessory drive system 11 includes an engine 12 configured to transmit output to a drive pulley 16 and to an electric variable transmission (EVT) 18. The engine 12 is operatively connected to and controlled by a controller 22. The drive pulley 16 is operatively connected to the engine 12 via a crank shaft or output shaft 14. The EVT 18 includes a gear-set 19 operatively connected to first and second motor/generators 20a, 20b, as is well-known in the art. The gear-set 19 will hereinafter be described as a planetary gear-set; however, other gear-set configurations may be envisioned. The first and second motor/generators 20a, 20b are each operatively connected to the controller 22. The controller 22 may be configured to include a hybrid control module, engine control module, transmission control module, motor-generator control modules and necessary electronic drives or power electronics circuits. The controller 22 is also operatively connected to an energy storage device 23. According to a preferred embodiment, the storage device 23 is a battery; however, alternate storage devices may be envisioned. The EVT 18 is operatively connected to a final drive system 32 which is configured to drive the hybrid electric vehicle 10.

The EVT 18 is configured to selectively produce a wide range of input/output speed ratios. For purposes of the present invention, "speed ratio" is defined as the transmission input speed divided by the transmission output speed. Therefore, by controlling the EVT 18 to produce zero transmission output speed at a given transmission input speed, the gear speed ratio is effectively infinite. In this manner, the accessory drive system 11 may be selectively de-coupled from the final drive system 32, such that the accessories 30, 30', and 30" remain operational even when the vehicle 10 is stopped. EVT mechanisms capable of providing this feature are known in the art and are therefore not described in detail.

According to a preferred embodiment, the motor/generator 20a is connected to a first member (not shown) of the planetary gear-set 19. A transmission input shaft 21 is connected with a second member (not shown) of the planetary gear set 19 and with the crankshaft 14 of the engine 12. The motor/generator 20b is correspondingly connected to a third member (not shown) of planetary gear-set 19, transmission output shaft 25, and the final drive system 32. It should be appreciated that the preceding motor/generator connections are described according to the preferred embodiment in a non-limiting manner, and that there are numerous alternate ways to connect the motor/generators 20a, 20b to the gear arrangement 19. There are also numerous gear arrangements that can be used in the EVT 18.

The drive pulley 16 is connected to a plurality of driven pulleys 26, 26', and 26" via a drive belt 24. Each of the driven pulleys 26, 26', 26" is connected to one of a plurality of accessories 30, 30', 30", respectively, such that the rotation of the driven pulleys 26, 26', 26" transfers power to drive the accessories 30, 30', 30" connected respectively thereto. The accessories 30, 30', 30" may include, for example, a power steering pump, a water pump, or an air conditioning compressor.

Power from the engine 12 is transferable through the output shaft 14, through the drive pulley 16, through the drive belt 24, and through the driven pulleys 26, 26', 26" to power the accessories 30, 30', 30". Alternatively, power from the motor/generators 20a, 20b of the EVT 18 is transferable through the engine output shaft 14, through the drive pulley 16, through the drive belt 24, and through the driven pulleys 26, 26', 26" to power the accessories 30, 30', 30". In order to power the accessories of a hybrid vehicle when the engine is off, it was conventionally necessary to provide a separate electric motor for each such accessory. Therefore, by controlling the EVT 18 to power all of the accessories 30, 30', 30" when the engine 12 is off, the present invention saves the cost associated with manufacturing and installing the plurality of electric motors otherwise required to power the accessories 30, 30', 30".

The accessories 30, 30', 30" must each be driven above a predefined minimum speed in order to remain fully operational. Therefore, according to a preferred embodiment, the present invention establishes a predetermined minimum engine speed $V_m$ calculated to ensure the accessories 30, 30', 30" are adequately powered and remain operational. For purposes of the present invention, the accessories 30, 30', 30" are "adequately powered" when they together receive enough power so that each remains fully operational, and "engine speed" is defined as the rotational speed of the crankshaft 14 measured using a conventional speed sensor (not shown) attached thereto. It should be appreciated that while engine speed is preferably monitored and controlled to ensure the accessories 30, 30', 30" are together adequately powered, alternate embodiments may monitor and control other characteristics of the accessory drive system 11 such as, for example, the rotational speed of one or more of the pulleys 16, 26, 26', 26" and/or the drive belt 24.

Under operating conditions wherein the engine 12 is fueled and running normally, the accessories 30, 30', and 30" are driven by power from the engine 12, just as in conventional vehicles.

Under operating conditions that normally call for fuel to the engine 12 of the hybrid electric vehicle 10 to be cut off, the controller 22 shuts off the transfer of fuel to the engine 12, and one or both of the motor/generators 20a, 20b are operated to power the accessories 30, 30', 30". More precisely, after the transfer of fuel is shut off, the controller 22 commands the motor/generators 20a, 20b to provide the necessary EVT 18 input/output speed ratio to realize the desired vehicle speed and acceleration or deceleration requested by the driver, while ensuring that the engine speed does not fall below the predefined minimum engine speed $V_m$. Controlling EVTs to yield various speed ratios is known in the art. Maintaining a minimum engine speed $V_m$ ensures that when fuel supply to the engine 12 is cut off, power would be transmitted from the motor-generators 20a, 20b through the engine crankshaft 14, the drive pulley 16, the drive belt 24, the driven pulleys 26, 26', 26" and to the accessories 30, 30', 30". This method ensures that the accessories 30, 30', 30" remain operational under operating conditions that call for engine fuel cut-off, without the need for individual electric accessory drives.

As the motor/generators 20a, 20b transfer power to the accessories 30, 30', and 30" through the engine 12, the crankshaft 14 attached thereto is also necessarily being driven. In other words, the engine crankshaft 14 is serving as a torque/power transmitting device. For engines equipped with flexible valve actuation, the controller 22 can appropriately manipulate the intake valves 13a and exhaust valves 13b (for example, keeping both the intake valves 13a and the exhaust valves 13b closed) when fuel to the engine 12 is shut off and the accessories 30, 30', and 30" are being driven by power from the motor-generators 20a, 20b through the engine crankshaft 14, in order to reduce crankshaft rotational resistance and engine pumping losses, and thereby improve the efficiency of the accessory drive system 11.

While the best modes for carrying out the invention have been described in detail, those familiar with the art to which this invention relates will recognize various alternative designs and embodiments for practicing the invention within the scope of the appended claims.

The invention claimed is:

1. An automotive accessory drive system for a hybrid electric vehicle comprising:
   an engine;
   an electric variable transmission operatively connected to the engine, said electric variable transmission including a gear arrangement and at least two motor-generators, said electric variable transmission being configured to selectively produce a plurality of speed ratios;
   a drive pulley connected to an output shaft of said engine;
   a plurality of driven pulleys each of which is connected to one of a plurality of accessories;
   a drive belt connectively coupling said drive pulley and said plurality of driven pulleys and operable to transfer drive forces between said drive pulley and said plurality of driven pulleys;
   a controller operatively connected to the engine and the electric variable transmission, said controller configured to ensure the plurality of accessories remain adequately powered by selecting a speed ratio adapted to ensure that the speed at which the accessories are driven does not fall below a predefined minimum speed;

wherein the engine includes a plurality of intake valves; a plurality of exhaust valves; and a crankshaft; and wherein the controller is configurable to manipulate the intake valves and the exhaust valves when the accessories are being driven by power from the motor-generators through the engine crankshaft, in order to reduce crankshaft rotational resistance and engine pumping losses, and thereby improve the efficiency of the accessory drive system.

2. The automotive accessory drive system of claim 1, wherein the electric variable transmission includes a storage device operatively connected to the motor/generators, said storage device being configured to store energy from the motor/generators when excess power is being produced by the engine.

3. The automotive accessory drive system of claim 2, wherein the storage device is a battery operable to supply power to the motor/generators.

4. The automotive accessory drive system of claim 1, wherein the gear arrangement is a planetary gear arrangement.

5. The automotive accessory drive system of claim 1, wherein the motor/generators includes a first motor/generator and a second motor/generator.

6. An automotive accessory drive system for a hybrid electric vehicle comprising:

an engine;

an electric variable transmission operatively connected to said engine, said electric variable transmission including:

a gear arrangement configured to selectively produce a plurality of speed ratios;

at least two motor/generators connected to said gear arrangement; and a storage device connected to said motor/generators;

a drive pulley connected to an output shaft of said engine;

a plurality of driven pulleys each of which is connected to one of a plurality of accessories;

a drive belt connectively coupling said drive pulley and said plurality of driven pulleys and operable to transfer drive forces between said drive pulley and said plurality of driven pulleys;

a controller operatively connected to the engine and the motor/generators, said controller configured to control the engine and the motor/generators to ensure said plurality of accessories are adequately powered without the need for individual motors for each accessory;

wherein the engine includes a plurality of intake valves; a plurality of exhaust valves; and a crankshaft; and wherein the controller is configurable to manipulate the intake valves and the exhaust valves when the accessories are being driven by power from the motor-generators through the engine crankshaft, in order to reduce crankshaft rotational resistance and engine pumping losses, and thereby improve the efficiency of the accessory drive system.

7. The automotive accessory drive system of claim 6, wherein the gear arrangement is a planetary gear-set.

8. The automotive accessory drive system of claim 7, wherein the storage device is a battery operable to supply power to the motor/generator.

9. A method for operating an accessory drive system of a hybrid electric vehicle comprising:

providing an engine operatively connected to an electric variable transmission;

transferring energy from the electric variable transmission to a plurality of accessories;

establishing a predefined minimum speed at which all of said plurality of accessories must be driven in order to remain fully operational;

controlling the electric variable transmission to produce a speed ratio selected to ensure that the speed at which the accessories are driven does not fall below the predefined minimum speed; and manipulating a plurality of intake valves and exhaust valves of the engine when the accessories are being driven by power from the electric variable transmission through an engine crankshaft, in order to reduce crankshaft rotational resistance and engine pumping losses, and thereby improve the efficiency of the accessory drive system.

* * * * *